United States Patent [19]

Shigeta

[11] Patent Number: 5,353,572

[45] Date of Patent: Oct. 11, 1994

[54] SEALING DEVICE OF PACKAGING DEVICE

[75] Inventor: Toshio Shigeta, Chiba, Japan

[73] Assignee: Tokyo Automatic Machinery Works, Ltd., Tokyo, Japan

[21] Appl. No.: 998,583

[22] Filed: Dec. 30, 1992

[30] Foreign Application Priority Data

Jan. 28, 1992 [JP] Japan .................. 4-013335

[51] Int. Cl.$^5$ .................. B65B 7/04; B65B 51/18
[52] U.S. Cl. .................. 53/371.5; 53/377.8; 53/387.3; 156/583.5
[58] Field of Search .................. 156/583.5; 53/371.3, 53/371.4, 371.5, 371.6, 375.9, 376.2, 377.8, 387.3

[56] References Cited

U.S. PATENT DOCUMENTS

| | | |
|---|---|---|
| 3,157,975 | 11/1964 | Altman . |
| 3,829,338 | 8/1974 | Hayasi et al. .................. 156/583.5 X |
| 4,680,073 | 7/1987 | Brunner et al. .................. 156/583.5 X |
| 4,981,006 | 1/1991 | Caenazzo et al. .................. 53/387.3 |
| 4,999,970 | 3/1991 | Bamrungbhuet et al. . |
| 5,005,473 | 4/1991 | Ishigashi .................. 156/583.5 X |
| 5,046,258 | 9/1991 | Cahill et al. . |
| 5,048,260 | 9/1991 | Raymond et al. . |
| 5,183,525 | 2/1993 | Thomas .................. 156/583.5 X |

FOREIGN PATENT DOCUMENTS

| | | |
|---|---|---|
| 114269 | 12/1941 | Australia .................. 53/371.5 |
| 0351553 | 1/1990 | European Pat. Off. . |
| 1250418 | 12/1960 | France . |
| 61-39251 | 9/1986 | Japan . |
| 1294406 | 11/1989 | Japan . |
| 2-85109 | 3/1990 | Japan . |
| WO9105706 | 5/1991 | PCT Int'l Appl. . |
| 1008336 | 10/1965 | United Kingdom . |

Primary Examiner—Linda B. Johnson
Attorney, Agent, or Firm—Sandler Greenblum & Bernstein

[57] ABSTRACT

The total heating energy to be given to the folded parts of packages (i.e. box-like items) is changed within a short period of time in response to a variation of transferring speed of the box-like items. As the heater moving mechanisms are operated, each of the heater blocks is moved towards or away from the inside parts of each of the package conveying annular belts in synchronization with the transferring speed of the box-like items. The number of heated blocks abutting against the inside parts of each of the annular belts is varied in response to the transferring speed of the box-like items.

11 Claims, 8 Drawing Sheets

FIG. I

SEALING DEVICE OF PACKAGING DEVICE

BACKGROUND OF THE INVENTION

1. Field of the Invention

This invention relates to a sealing device for a packaging machine for utilizing thermoplastic packaging sheet such as cellophane or polypropylene to form a cover on box-like items such as cigarettes covered by a packaging sheet, for example. More particularly, the invention relates to a sealing device in which annular belts are wound around, in opposition to the right and left sides of the box-like items, along both right and left sides of a transferring passage for continuously transferring the box-like items. For example, both of the annular belts are moved toward a transferring direction of the box-like items in synchronism with their transferring speed, a plurality of heater blocks are disposed within each of the annular belts along the transferring direction, and heat from the heater blocks is transmitted to the folding parts of the folded packaging sheet along the right and left side surfaces of the box-like items through the inner sides of each of the annular belts so as to thermally adhere the folding parts of the packaging sheets.

2. Background and Material Information

In the prior art sealing device for a packaging machine, according to a system disclosed in Japanese Patent Laid-Open No. Hei 1-294406, a plurality of heater blocks are abutted against the inner sides of each of the annular belts and the right and left side surfaces of the box-like items by springs acting with a specified pressure. As the folded box-like items pass between these right and left annular belts, both folded parts are held by the inner side of each of the annular belts, heat from the heater blocks is transmitted to thermally melt both folded parts and at the same time, a plurality of heater blocks are separately heated so that a temperature of each of the annular belts is controlled in response to a transferring speed of the box-like items. Then, a specified amount of heating calories is given to each of the folded parts that is related to a variation in the transfer speed of the box-like items.

In addition, the sealing device for a packaging machine can be constructed as disclosed in Japanese Patent Publication No. Sho 61-39251, for example. A winding device for winding the packaging sheet around the box-like items and a folding device for the projecting ends of the packaging sheet which project from the right and left side surfaces of the wound box-like items in a rectangular cylinder form along the side surfaces are continuously disposed as a pre-stage. An item discharging device for discharging box-like items of poor packaged state quality, a multi-stage piling and discharging device for piling up the items in a predetermined number of stages, and discharging the items into a box packaging stage as a post-stage are continuously disposed and they cooperate with other devices placed thereacross.

However, such a prior art sealing device for a packaging machine has some problems including that a plurality of heater blocks are always abutted against the annular belts. Even if a temperature of the heater blocks is lowered or decreased, for example, the temperature is not decreased rapidly due to its surplus heat. Thus in particular, in case that an operating speed (i.e. a transferring speed of the box-like items) may easily be varied, a total amount of heat transferred to the box-like items in response to the transferring speed may not be changed within a short period of time, even though the transferring speed of the box-like items is required to be rapidly accelerated or rapidly decelerated within a short period of time. As a result, a specified amount of heating calories may not be given to the folded parts of the packaging sheet to be transferred at a different speed, and a finished state of the thermal melting is not made uniform, and a poor item may easily be produced.

SUMMARY OF THE INVENTION

In view of the foregoing circumstances in the prior art, it is an object of the present invention to vary a total amount of heating calories given to the folded parts in response to a variation of the transferring speed of the box-like items within a short period of time.

The technical means provided by the present invention in order to solve the aforesaid problems is characterized in that a plurality of heater blocks are supported at the inside parts of each of the annular belts in a direction perpendicular to the transferring direction of the box-like items in such a way that they may be moved towards or away from the belts. Heater moving mechanisms are provided for moving these heater blocks to or from the inside parts of each of the annular belts in synchronism with a transferring speed of the box-like items.

Thus, it is preferable that the heater moving mechanisms cause the heater blocks disposed at an upstream side, in the transferring direction, to be abutted against the inside parts of the annular belts in sequence, as the transferring speed of the box-like items is accelerated and to further cause the heater blocks disposed at a downstream side, to be moved away from the inside parts of the annular belts in sequence, as the transferring speed of the box-like items is decelerated.

In addition, it may also be applicable that the heater moving mechanisms cams are positioned along the outer surfaces of a plurality of heater blocks in such a way as they may be reciprocated in a transferring direction and a counter-transferring direction of the box-like items and bias the outer surfaces of these heater blocks toward the inclined surfaces of each of the cams and at the same time the cams may be reciprocated in synchronism with the transferring speed of the box-like items.

According to the aforesaid technical means, the present invention is operated such that the number of heater blocks abutted against the inside parts of each of the annular belts is varied in response to a transferring speed of the box-like items by moving the heater blocks to or away from the inside parts of each of the annular belts in synchronism with the transferring speed of the box-like items as the heater moving mechanisms are operated.

Further, the heater blocks at the upstream side are abutted against the inside parts of the annular belts in sequence, when the transferring speed of the box-like items is accelerated as the box-like items are advanced between the right and left annular belts. Thus, heat is continuously applied to both folded parts of the box-like items being transferred and, at the same time, when the transferring speed of the box-like items is decelerated, the heater blocks are moved away from the inside parts of the annular belts in sequence and thus no heat is applied midway between both folded parts of the box-like items being transferred.

DETAILED DESCRIPTION OF THE PREFERRED EMBODIMENT

Figure 5:
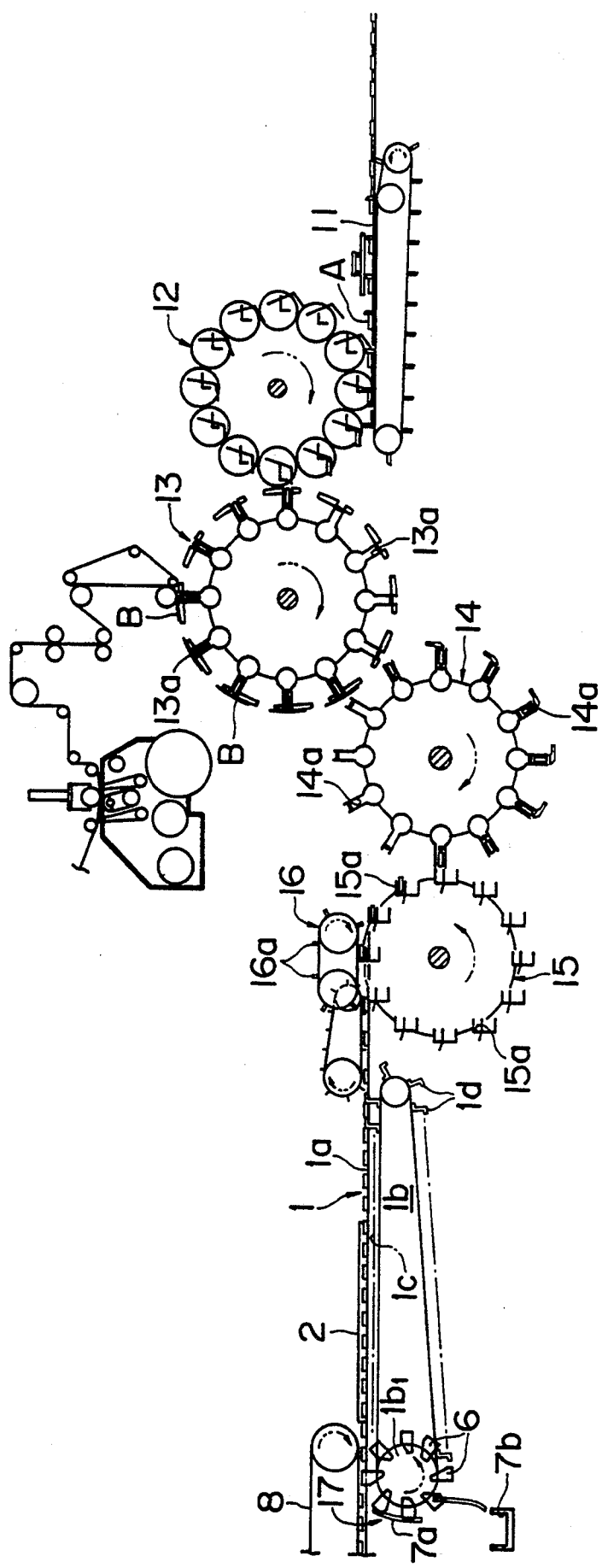
FIG. 5 is a reduced front elevational view, in a longitudinal section, for showing an entire packaging machine.

As shown in FIG. 5 in the preferred embodiment of the present invention, the cigarettes wrapped with a packaging sheet are continuously supplied as box-like items A at predetermined spacings, by a horizontal transporting conveyor 11. These box-like items A are picked up by the transferring wheels 12 one by one, and each of the items is delivered to the pockets 13a of the winding wheel 13 and are further delivered to the pockets 14a of the applying wheel 14 from the pockets 13a of the winding wheel 13. Thus, a thermoplastic transparent film, such as cellophane or polypropylene, which serves as the wrapping of packaging sheet B, is wound around in a U-shape about a surface of each of the box-like items A. Thereafter, both ends of the packaging sheet B are folded along the surfaces of the box-like items A, while the items are being continuously transferred by the applying wheel 14 so as to thermally adhere them to each other. The items are then delivered into the pockets 15a of the folding wheel 15. The box-like items A, transferred in an arcuate path, are held by holding claws 16a, 16a of the low speed conveyor 16, whereby the box-like items A are pulled out of each of the pockets 15a onto a horizontal transferring passage. The expanding ends projected from the right and left side surfaces A1, A1 of the box-like items A, forming a rectangular shape are folded, and subsequently the box-like items A are continuously transferred along the transferring passage 1 up to the annular belts 2, 2.

Figure 2:
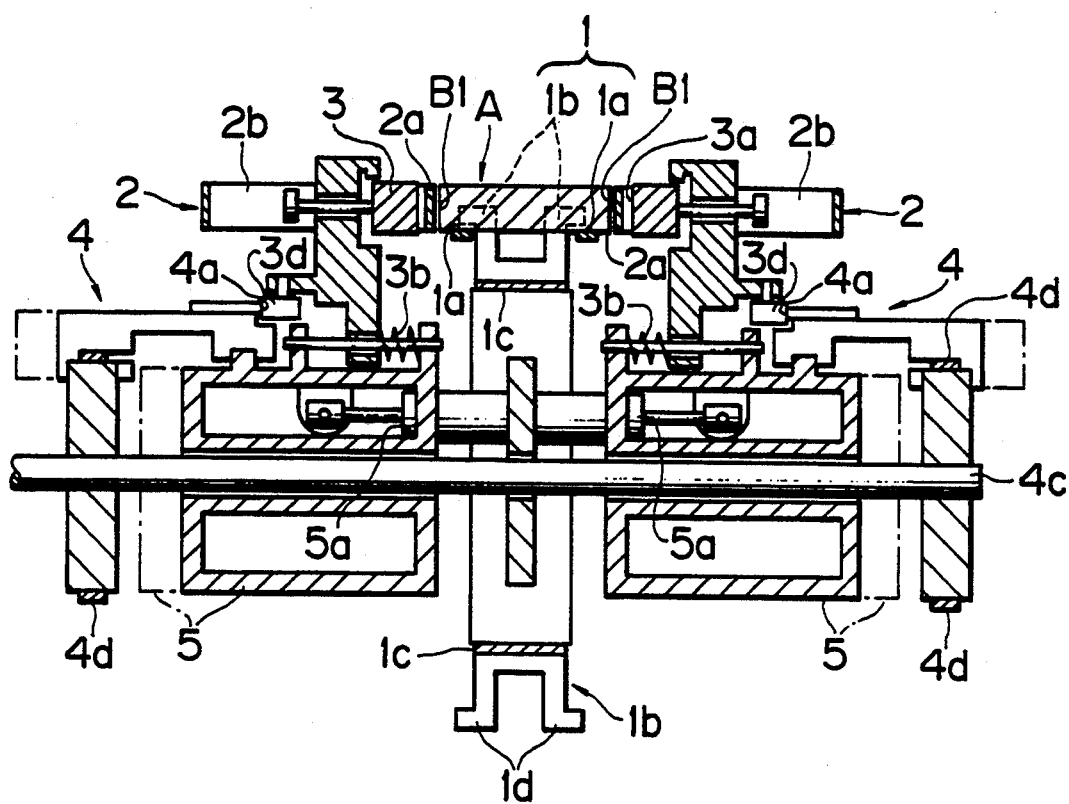
FIG. 2 is an enlarged side elevational view in a longitudinal section taken along a line (2)—(2) of FIG. 1.
Figure 3:
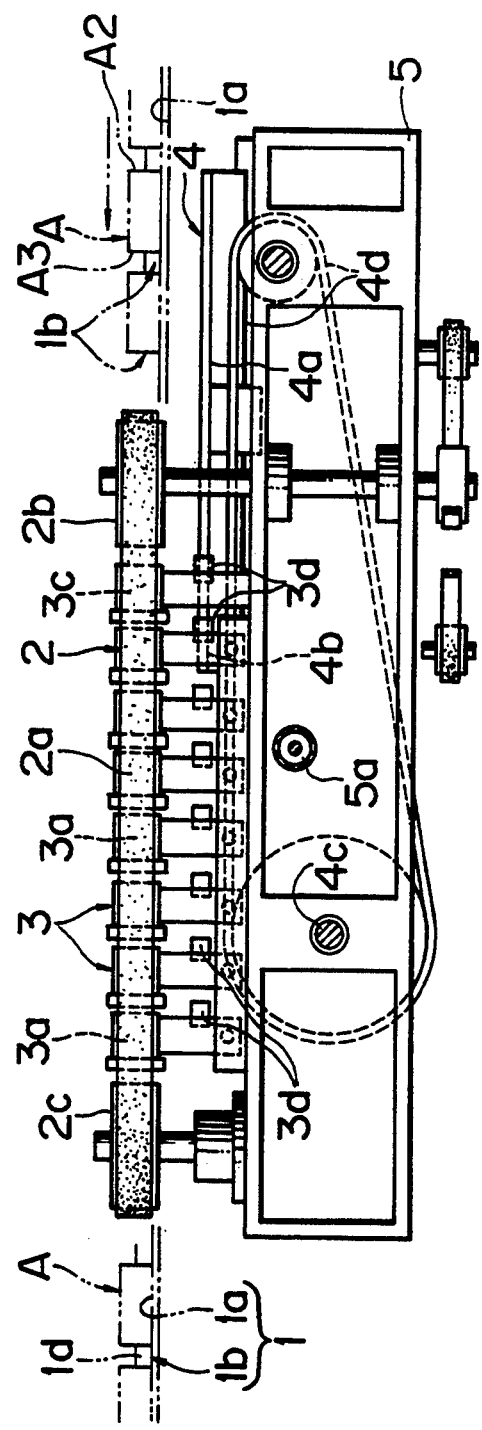
FIG. 3 is a front elevational view in a longitudinal section taken along a line (3)—(3) of FIG. 1.

The transferring passage 1 (FIG. 2) is comprised of a horizontal mounting surface 1a extending in a transferring direction of the box-like items A and a transporting conveyor 1b. The transporting conveyor 1b winds the belt 1c along the mounting surface 1a in a transferring direction of the box-like items A. Pushing claws 1d, for holding the items in opposition against the rear surface A2 and the front surface A3 of each of the box-like items A, are projected at the outer circumference of the belt 1c, while being opened to the same size as the width, in the transferring direction of the box-like items A. At the same time, the transporting conveyor driving source is cooperatively related to the driving source for the folding wheel 15 or the low speed conveyor 16, or the like, thereby it is continuously operated in synchronism with an operating speed of the folding wheel 15 or the low speed conveyor 16, or the like.

Supporting members 5, 5 (FIGS. 1 and 2) are disposed below the mounting surface 1a in a rightward and/or leftward direction perpendicular to the transferring direction of the box-like items A so as to be movable in a horizontal direction. Each of the inside parts 2a, 2a of the annular belts, 2, 2 is disposed in opposition to the folding parts B1, B1 of the packaging sheet B folded along the right and left side surfaces A1, A1 of the box-like items A. Emergency driving members 5a, 5a, such as air cylinders, able to be reciprocated in a rightward or leftward direction, for example, are cooperatively related to the supporting members 5, 5. The emergency driving parts 5a, 5a are cooperatively related to the driving source for the transporting conveyor 1b and the supporting members 5, 5 are moved away (to the dotted-line position in FIG. 2) from the right and left side surfaces A1, A1 of the box-like items A fed onto the mounting surface 1a when the operation of the transporting conveyor 1b is stopped.

The annular belts 2, 2 are stainless steel belts, for example, formed into bondable form by superior thermo-conductive metal or the like and are wound around the driving pulleys 2b, 2b, which are spaced apart in the transferring direction of the box-like items A from the driven pulleys 2c, 2c mounted to the supporting members 5, 5 along the transferring direction of the box-like items A. The inside parts 2a, 2a are disposed in parallel on substantially the same vertical elevation of the right and left side surfaces A1, A1 of the box-like items A supplied on the mounting surface 1a. At the same time, the driving pulleys 2b, 2b are cooperatively related with the driving source for the transporting conveyor 1b, thereby the inside parts 2a, 2a are synchronously and continuously moved in such a way that their speeds become substantially equal to the operating speed of the transporting conveyor 1b.

When the movement of the transporting conveyor 1b is stopped, the inside parts 2a, 2a of the annular belts 2, 2 are continuously moved in cooperation with the emergency driving source and a plurality of heater blocks 3 are disposed within the annular belts 2, 2 along the transferring direction of the box-like items A.

Figure 1:
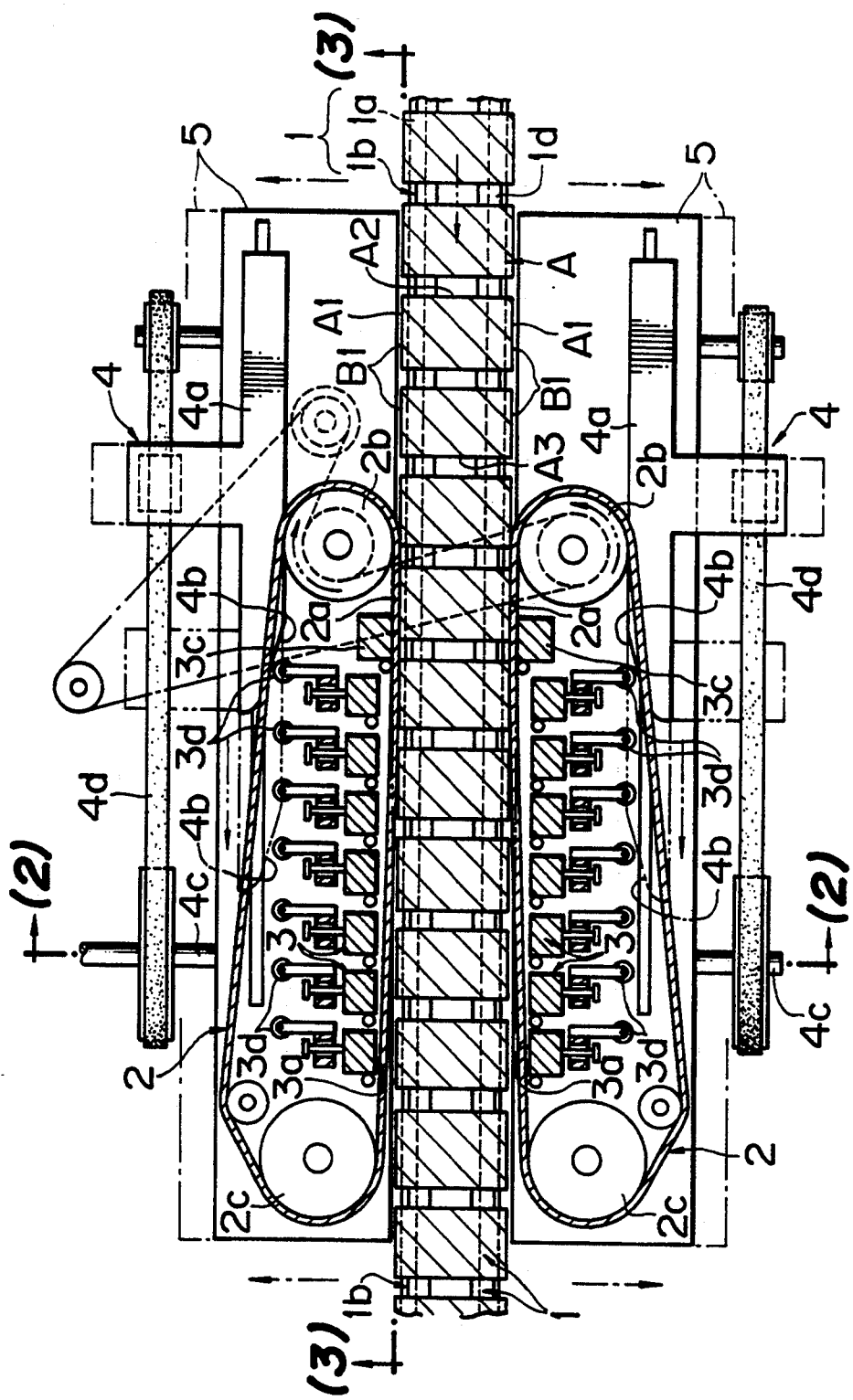
FIG. 1 is a top plan view, with a part being broken away, for showing the sealing device of a packaging machine of one preferred embodiment of the present invention, wherein a state in which the box-like items are transferred at a minimum speed is indicated by a solid line, an accelerated state is indicated by a two-dotted line and a state in which a transferring of the box-like items is stopped is indicated by a dotted line.

The heater blocks 3 are of well-known structure or construction, which generate heat under an electrical energization, wherein the heater blocks, except the heater blocks 3c, 3c disposed at the most upstream side, in the transferring direction of the box-like items A, are supported by the supporting members 5,5 in such a way that they may be reciprocated horizontally in a rightward or a leftward direction (FIG. 1). Thus these inner surfaces 3a are disposed such that they may be moved towards or away from the inside parts 2a, 2a of the annular belts 2, 2 and at the same time, they are always biased toward the cams 4a, 4a (to be described later), and spaced from the inside parts 2a, 2a of the annular belts 2, 2 with the resilient members 3b such as springs, for example. The heater blocks 3c, 3c disposed at the most upstream side are always abutted against the inside parts 2a, 2a of the annular belts 2, 2 and fixedly disposed.

In addition, the heater blocks 3 are provided with the heater moving mechanisms 4, 4, for moving the blocks towards or away from the inside parts 2a, 2a of the annular belts 2, 2 in synchronism with the transferring speed of the box-like items A. These heater moving mechanisms 4, 4 are constructed such that the cams 4a, 4a are laterally disposed along the outer surfaces of the heater blocks 3 such that each of them may be reciprocated horizontally in a transferring direction and a counter transferring direction of the box-like items A. The follower rollers 3d are rotatably projected in a transferring direction of the box-like items A at the outer surfaces of the heater blocks 3 in opposition to these cams 4a, 4a.

The cams 4a, 4a have inclined surfaces 4b, 4b which gradually expand in a rightward or a leftward direction, downstream at the surfaces opposing the follower rollers 3d. Each of the cams is further provided with the driving part 4c, cooperatively related to the driving source for the transporting conveyor 1b, thereby the cams are reciprocated in synchronism with a moving speed of the transporting conveyor 1b.

In the preferred embodiment of the present invention, the driving part 4c is a power driving shaft which is normally rotated, when a moving speed of the transporting conveyor 1b is accelerated. In turn, when the transferring speed is decelerated, it is rotated in a reverse direction. The power driving shaft 4c and the cams 4a, 4a are cooperatively related to each other through the transmitting members 4d, 4d such as a belt or a chain or the like, thereby when a transferring speed of the transporting conveyor 1b is accelerated, the cams 4a, 4a are moved toward the transferring direction of the box-like items A in accordance with an amount of acceleration. Similarly when the transferring speed of the transporting conveyor 1b is decelerated, the cams 4a, 4a are moved in a counter-transferring direction of the box-like items A in accordance with the amount of deceleration.

Accordingly, as the transferring speed of the box-like items A is accelerated, the cams 4a, 4a are moved toward the transferring direction of the box-like items A, and the heater blocks 3 disposed at the upstream side in the transferring direction are abutted in sequence against the inside parts 2a, 2a of the annular belts 2, 2. When the transferring speed of the box-like items A reaches its maximum speed, all the heater blocks 3 are abutted against the inside parts 2a, 2a of the annular belts 2, 2. When the transferring speed of the box-like items A is decelerated, the cams 4a, 4a are moved in a counter-transferring direction of the box-like items A, and the heater blocks 3 disposed at the downstream side are moved away from the inside parts 2a, 2a of the annular belts 2, 2 in sequence. Thus, when the transferring speed of the box-like items A reaches its minimum speed, all the heater blocks 3 except the heater blocks 3c, 3c disposed at the upstream end side are moved away from the inside parts 2a, 2a of the annular belts 2, 2.

At the downstream side pulley $1b_1$, disposed at the downstream end of the transporting conveyor 1b, each of the disks 1e, 1e is projected at both rightward and leftward directions on the same vertical elevation as the right and left side surfaces A1, A1 of the box-like items A. The outer circumferential upper end positions of these right and left disks 1e, 1e are set on an extended line of the mounting surface 1a, and the box-like items A are transferred in sequence from the mounting surface 1a to the outer circumferential upper end positions of the disks 1e, 1e in sequence. At the same time, a plurality of item holding mechanisms 6, of the item discharging device 17, acting as a post-stage, are disposed in a circumferential direction of the disks 1e, 1e at the same spacing as the width of the box-like items A toward the transferring direction so as to oppose to the right and left side surfaces A1, A1 of the box-like items A to be transferred to the outer circumferential upper end positions of the disk members 1e, 1e.

Each of the item holding mechanisms 6 is operated temporarily, to hold each of the box-like items A transported to the outer circumferential upper end positions of the disks 1e, 1e or suck it, in response to an input of a discharging signal. In the preferred embodiment, the holding claws 6a, 6a of substantial L-shape engaged with the right and left side surfaces A3, A3 and the upper surface A4 are disposed against each of the right and left side surfaces A1, A1 of each of the box-like items A in such a way as it may be moved to or away from the side surfaces. In addition, the pressing pieces 6b, 6b are biased toward the right and left side surfaces A1, A1 of the box-like items A with respect to each of the holding claws 6a, 6a, as required through resilient members $6b_1$, $6b_1$ such as springs which are disposed to press the pieces 6b, 6b against the right and left side surfaces of A1, A1 of each of the box-like items A in such a way as they may be moved to or away from it. Further, each of the base ends $6a_1$, $6a_1$ of the holding claws 6a, 6a is cooperatively related.

The control cam 7 (FIGS. 7 and 8) is comprised of cam followers 7a which are cooperatively related to each of the base ends $6a_1$, $6a_1$ of the holding claws 6a, 6a; a fixed cam plate 7b contacting with these cam followers 7a, which is fixed and disposed without being related to the rotations of the downstream side pulley $1b_1$ of the transporting conveyor 1b and the disk places 1e, 1e; a moving cam 7c being in contact with the cam followers 7a disposed in respect to the fixed cam plate 7b in such a way as it may be reciprocated vertically; and a driving part 7d such as an air cylinder, for example for electrically communicating with a sensor for sensing a poor packaging or a manual switch for quality control disposed at the packaging device of the previous stage, or the like. The driving part 7d is operated to raise the moving cam 7c temporarily, only when the box-like items A to be fed out passes through the outer circumferential upper end positions of the disk plates 1e, 1e in response to a discharging signal outputted from the sensor or the manual switch for quality control, or the like.

In the case that a discharging signal is not outputted from the manual switch for quality control to the driving part 7d of the control cam 7, the cam followers 7a are rotated along the periphery of the fixed cam plate 7b as the disks 1e, 1e are rotated, thereby the holding claws 6a, 6a and the pressing pieces 6b, 6b are moved away from the right and left side surfaces A1, A1 of each of the box-like items A. When a discharging signal is outputted to the driving part 7d, the cam followers 7a are rotated along the periphery of the moving cam 7c, which as been moved upwardly as the disks 1e, 1e are rotated. Thus when the discharging box-like items A reach to the outer circumferential upper end positions of the disks 1e, 1e, the opposing holding claws 6a, 6a and the pressing pieces 6b, 6b are moved in an arcuate path while they are being moved away from the right and left side surfaces A1, A1 of each of the box-like items A. When a discharging signal is outputted to the driving part 7d, the cam followers 7a are rotated along the periphery of the moving cam 7c, which as been moved upwardly as the disks 1e, 1e are rotated. Thus, when the discharging box-like items A reach to the outer circumferential upper end positions of the disks 1e, 1e, the opposing claws 6a, 6a and the pressing pieces 6b, 6b are oscillated toward a direction approaching the right and left side surfaces A1, A1 of the box-like items A and they are moved in an arcuate path and at the same time they are moved in an arcuate path only for a predetermined spacing and then the holding claws 6a, 6a and the pressing pieces 6b, 6b are oscillated in a direction moving away from the right and left side surfaces A1, A1 of each of the box-like items A and returned to their initial states.

In addition, the discharging chute 7a, is fixed and disposed along the outer circumferences of the disks 1e, 1e near a position where the item holding mechanisms 6 release holding of the box-like items A and near a position, in the preferred embodiment, where the holding claws 6a, 6a and the pressing pieces 6b, 6b are moved by the control cam 7 toward a direction moving away from the right and left side surfaces A1, A1 of the box-like items A. Further a recovering box 7b, is disposed at a terminal end of the discharging chute 7a, so as to be removable.

A transporting conveyor 8 is continuously and laterally disposed along the mounting surface 1a from a slight upstream side position of the downstream side pulley 1b₁ toward a discharging conveyor 9 communicating with a device at a post-stage towards a downstream end of the transporting conveyor 1b. The box-like items A transported near the upstream end of the conveyor are sucked or held so as to immovably hold the box-like items with a higher item holding force than the item holding force of the item holding mechanisms 6. Further, the items are moved at the same speed as that of the transporting conveyor 1b and transported to the feeding-out conveyor 9.

In the preferred embodiment, an upstream side pulley 8a is disposed at an upstream side, slightly higher than a position opposite the outer circumferential upper end positions of the disks 1e, 1e with the box-like items A being held thereat. The downstream side pulley 8b is disposed at a position opposite and against the feeding-out conveyor 9 with the box-like items A being held thereat. A suction belt 8c is wound around these pulleys 8a, 8b so as to act as a so-called suction conveyor for transporting the box-like items A fed from the transporting conveyor 1b while they are being sucked. The driving source for the suction belt is cooperatively related to the driving source for the transporting conveyor 1b, and the suction belt 8c is continuously moved at a speed slightly faster than the moving speed of the transporting conveyor 1b, and as required, the holding pieces 8e, 8e biased by resilient members 8d, 8d such as springs toward the right and left side surfaces A1, A1 of the box-like items A are disposed against the box-like items A transferred from the transporting conveyor 1b, respectively. These holding pieces 8e, 8e are continuously moved in a synchronous manner to have the same speed as the moving speed of the suction belt 8c.

Operation of the sealing device of a packaging machine as described above will be explained as follows.

At first, as the folded box-like items A are transferred in sequence at a predetermined spacing onto the mounting surface 1a of the transferring passage 1 from the low speed conveyor 16 in the previous stage as shown in FIG. 5 and these box-like items A are continuously moved at predetermined spacing as shown in FIG. 1 by operation of the transporting conveyor 1b. The items advance in sequence between the annular belts 2, 2 positioned at the right and left sides, and each of the folded parts B1, B1 of the packaging folded sheet B along the right and left side surfaces A1, A1 of the box-like items A is abutted against the inside parts 2a, 2a of the annular belts 2, 2 held thereat and the items are transferred.

In this case, the cams 4a, 4a of the heater moving mechanisms 4 are reciprocated in response to the moving speed of the transporting conveyor 1b in a transferring direction and a counter-transferring direction of the box-like items A. Thus inner surfaces 3a of the heater blocks 3 are abutted against, in a number corresponding to the moving speed of the box-like items A, the inside parts 2A, 2A of the annular belts 2, 2 so as to heat the entire annular belts 2, 2. Heat from the inside parts 2a, 2a of these annular belts 2, 2 is transmitted to both folded parts B1, B1 of the right and left side surfaces A1, A1 of the box-like items A, and the folded parts are thermally adhered by the items completely passing between the annular belts 2,2.

Figure 4:
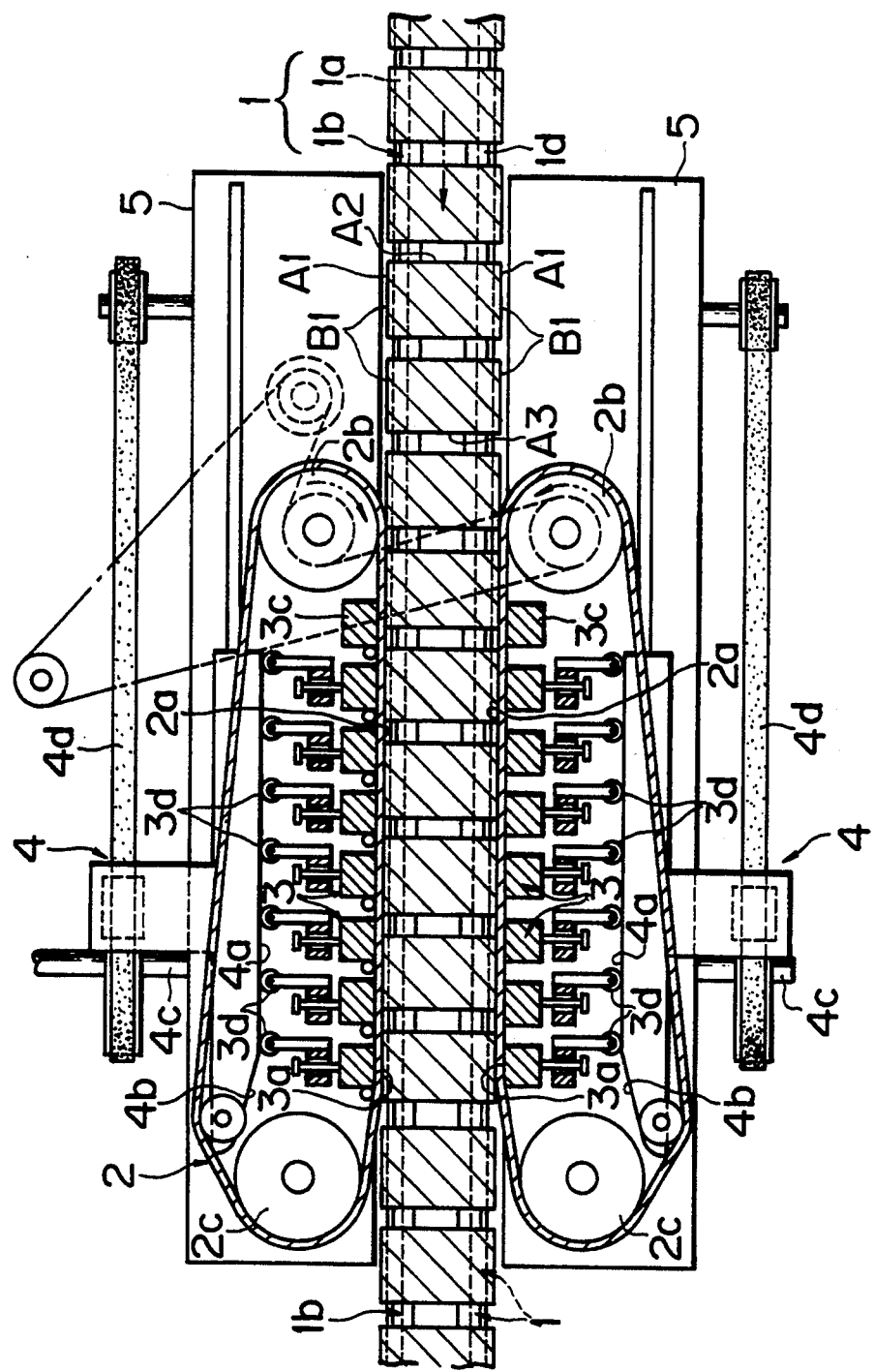
FIG. 4 is a top plan view, with a part being broken away, for showing a state in which the box-like items are transferred at a maximum speed.

As the moving speed of the transporting conveyor 1b is accelerated (i.e. increased) in response to an operating condition of the device positioned in the previous stage or the post-stage during the operation of the transporting conveyor 1b and the transferring speed of the box-like items A is accelerated (i.e. increased), the heater blocks 3 disposed at the upstream side, as shown by a two-dotted line in FIG. 1 are abutted against the inside parts 2a, 2a of the annular belts 2, 2 in sequence. Heat is continuously applied to both folded parts B1, B1 of the box-like items A along the middle while passing between the annular belts 2, 2 and when the transferring speed of the box-like items A reaches the maximum speed, as shown in FIG. 4, all the heater blocks 3 are abutted against the inside parts 2a, 2 A of the annular belts 2, 2. Thus heat is continuously applied until the items completely pass between the annular belts 2,2.

On the other hand, as the moving speed of the transporting conveyor 1b is decelerated (i.e. decreased) and the transferring speed of the box-like items A is decelerated, the heater blocks 3 disposed at the downstream side are moved away from the inside parts 2a, 2a of the annular belts 2, 2 in sequence and heat is not applied by all of the blocks along the middle of both folded parts B1, B1 of the box-like items A during their passings. As a result, when the transferring speed of the box-like items A reaches its minimum speed, as shown in a solid line in FIG. 1, all the heater blocks 3 except the heater blocks 3c, 3c disposed at the most upstream side are moved away from the inside parts 2a, 2a of the annular belts 2, 2 and only heat of the minimum temperature is given when the box-like items A pass through the heater blocks 3d, 3d disposed at the most upstream side.

In addition, during the operation of the transporting conveyor 1b, if its movement is stopped in response to an operating state of the device positioned in the previous stage or the post-stage, the transferring of the box-like items A is stopped. Thus, the inside parts 2a, 2a of the annular belts 2, 2 are moved away from both folded parts B1, B1 of the box-like items A passing between them, as shown by a dotted line in FIGS. 1 and 2 under an operation of the emergency driving parts 5a, 5a, heat is not applied more than that to prevent seizure. At the same time, the inside parts 2a, 2a of the annular belts 2, 2 are continuously moved at their minimum speed, the entire annular belts 2, 2 are heated by the heater blocks 3d, 3d disposed at the most upstream side and the blocks await restarting of movement.

Figure 6:
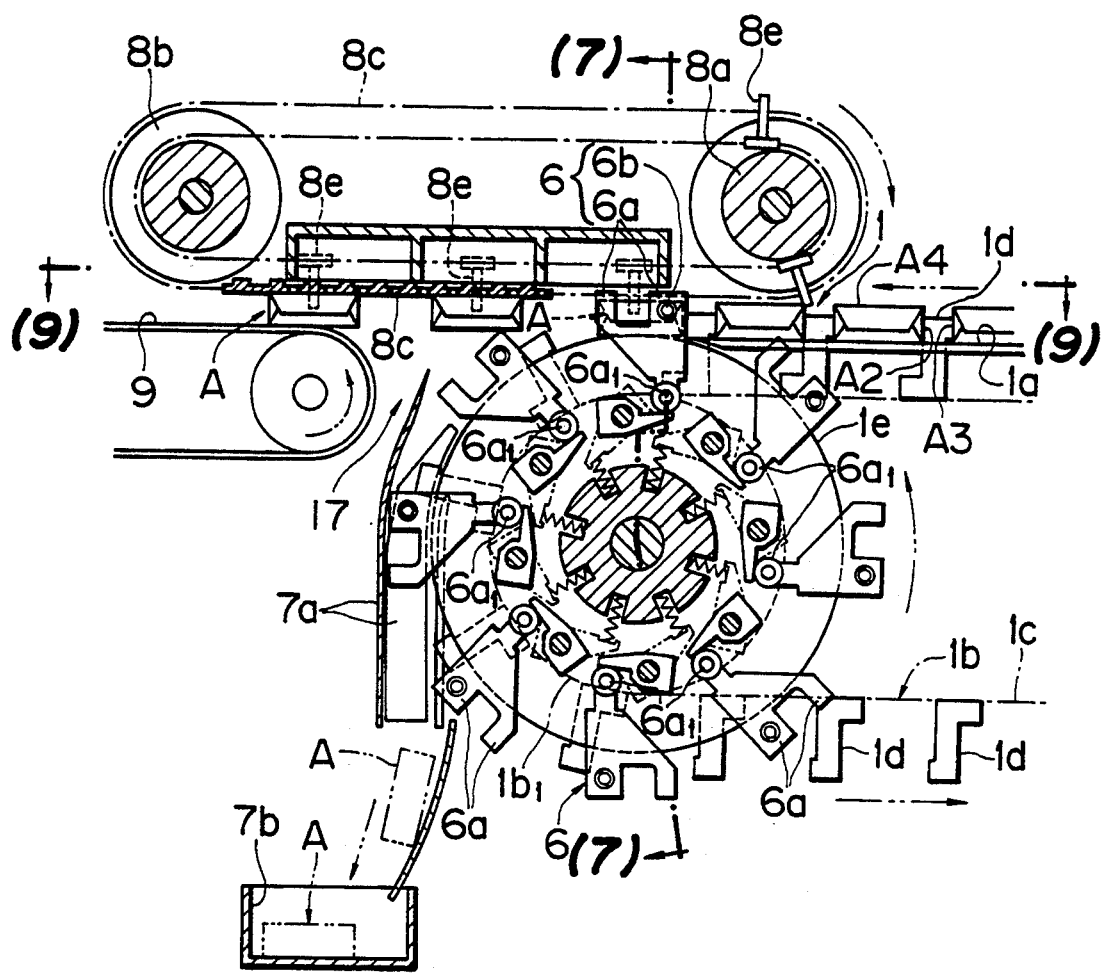
FIG. 6 is a front elevational view, in a longitudinal section, for showing an item discharging device in which the box-like items are being held.
Figure 7:
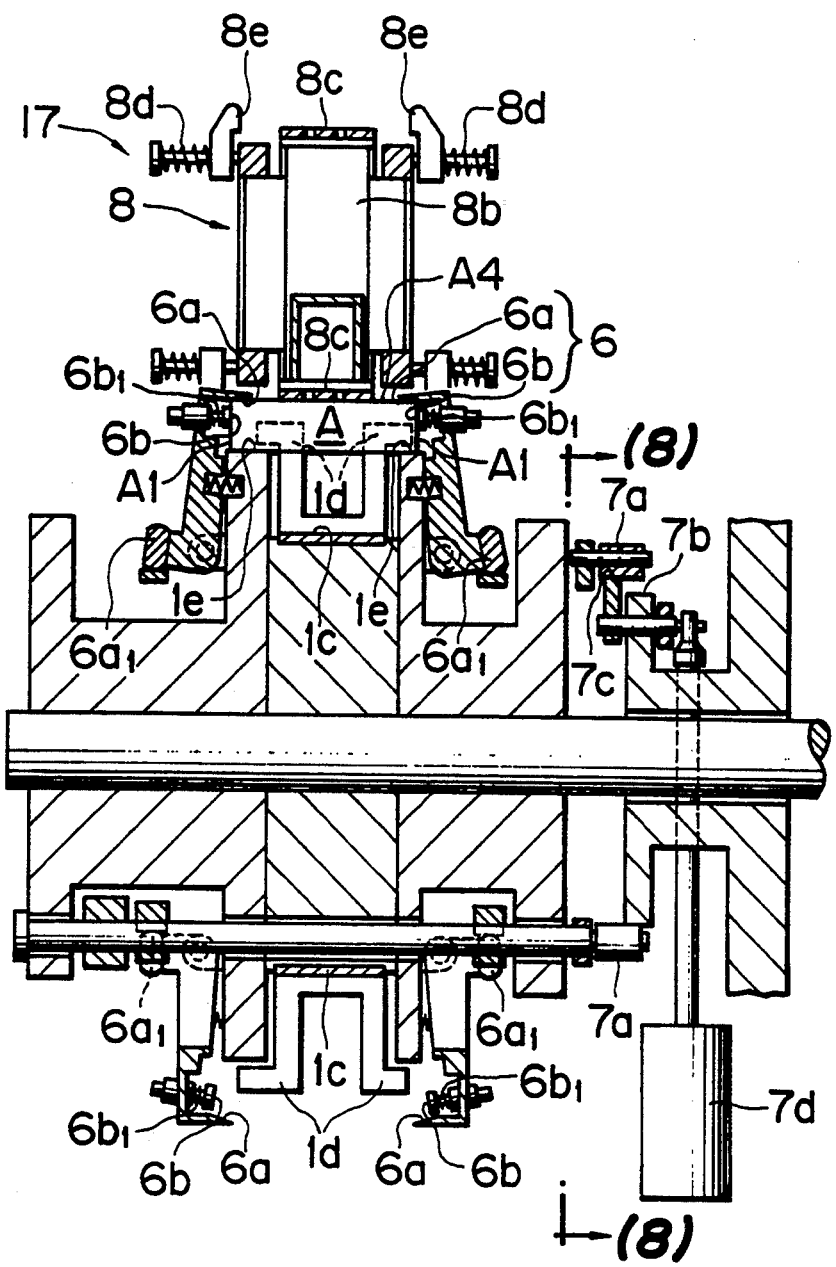
FIG. 7 is an enlarged side elevational view, in a longitudinal section, taken along a line (7)—(7) of FIG. 6.
Figure 8:
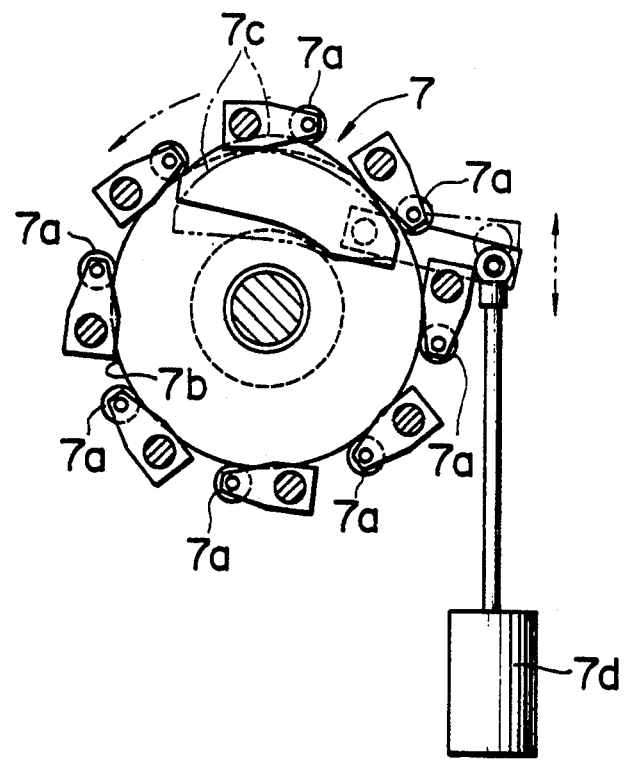
FIG. 8 is a front elevational view, in a longitudinal section, taken along a line (8)—(8) of FIG. 7.
Figure 9:
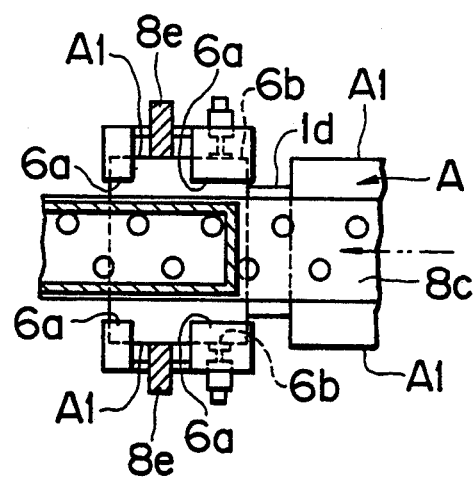
FIG. 9 is a partial enlarged top plan view, in a lateral section, taken along a line (9)—(9) of FIG. 6.

As shown in FIG. 6, as these box-like items A are continuously transferred to the downstream side pulley $1b_1$ while being kept at their predetermined spacings under operation of the transporting conveyor 1b, the item holding mechanisms 6 are operated as shown in FIG. 7 when each of the box-like items A reaches the outer circumferential upper end positions of the disks 1e, 1e and a discharging signal is outputted to the item 1e, 1e and a discharging signal is outputted to the item holding mechanisms 6 of the item discharging device 17, resulting in that the box-like items A held by the item holding mechanisms 6 are moved away from the mounting surface 1a under a rotation of the disks 1e, 1e and transferred in an arcuate path.

After this operation, as the item holding mechanisms 6 holding the box-like items A reach their predetermined angular positions, the holding of the box-like items A to be discharged is released and the mechanisms are returned to their initial states, resulting in that the box-like items A are transferred to the recovering box 7b, through the discharging chute $7a_1$.

In addition, when each of the box-like items A reach the outer circumferential upper end positions of the disks 1e, 1e and the discharging signal is not outputted to the item holding mechanisms 6, the item holding mechanisms 6 are not operated, the box-like items A are delivered to the transferring conveyor 8 and the items are transported to the post-stage by the feeding-out conveyor 9.

Therefore, the item discharging device 17 can be operated so an item is instantly guided out of the transferring passage without applying any shock against the items. Thus as compared with the item discharging device for projection and discharging the items with the reciprocating pushers, the items will not be collapsed even if the item transferring speed is accelerated in order to achieve a high processing speed, confirmation of the poor location can be carried out and at the same time, if the items are discharged as a result of quality-control, they can be re-used and they may be returned back again to the transferring passage.

In addition, since the rear surface A2 of the box-like items A to be discharged as the operation of the transporting conveyor 1b is performed are pushed up to the downstream side pulley $1b_1$, a position alignment between the item holding mechanisms 6 disposed at the downstream side pulley $1b_1$ and the pushed and discharged box-like items A becomes correct and the positive discharging operation is performed.

Although in the preferred embodiment described above the cigarettes packaged with a packaging sheet as the box-like items A are used, the present invention is not limited to these items, the box-like items A may be products other than the packaged cigarettes. Further, the structures of the heater moving mechanisms 4 are not limited to the above-described structures and other structures providing a similar operation may also be applied.

Since the present invention is constructed as described above, it has the following advantages.

1. As the heater moving mechanisms are operated, the number of heater blocks abutting against the inside parts of each of the annular belts is varied in response to a transferring speed of the box-like items by moving the blocks towards or away from the inside parts of each of the annular belts synchronously with the transferring speed of the box-like items. Thus, the total heating energy to be given to the folded parts, in response to the variation of the transferring speed of the box-like items, can be varied within a short period of time.

Therefore, as compared with the prior art system, in which a plurality of heater blocks are always abutted against the annular belts, and temperatures of the heater blocks are not rapidly decreased due to their surplus stored heat, for example, a specified amount of heating energy can be applied to the folded parts of the packaging sheet transferred at a speed differing from the set transferring speed of the box-like items to enable a finished state of the thermal adhered part to be rendered uniform. Thus, no poor items may be produced even if the transferring speed of the box-like items is rapidly accelerated or decelerated within a short period of time.

2. The heater moving mechanisms abut against the heater blocks disposed at the upstream side in the transferring direction to abut against the inside parts of the annular belts in sequence as the transferring speed of the box-like item is accelerated. The heater blocks disposed at the downstream side of the transferring direction are moved away from the inside parts of the annular belts in sequence when the speed is decreased. As a result, the heater blocks at the upstream side are abutted against the inside parts of the annular belts in sequence even if the transferring speed of the box-like items is accelerated while the box-like items are advanced between the right and left annular belts, and heat is continuously applied to both folded parts of the box-like items being transferred. The heater blocks at the downstream side are moved away from the inside parts of the annular belts in sequence even if the transferring speed of the box-like items is decelerated. Thus, no heat is applied to both folded parts of the box-like items being transferred at the middle part and a specified amount of heat can be applied to the box-like items being advanced between the right and left annular belts.

What is claimed is:

1. A sealing device for a packaging device comprising a plurality of annular belts being wound in opposition to right and left side surfaces of box-like items along both right and left sides of a transferring passage for continuously transferring the box-like items, said annular belts being moved toward a transferring direction of the box-like items in synchronism with a transferring speed of the items, a plurality of heater blocks being arranged inside of each of said annular belts along a transferring direction and heat from said heater blocks being transmitted to folded parts of a packaging-sheet folded along right and left side surfaces of the box-like items through inside parts of each of the annular belts to thermally adhere the folded parts; each of said plurality of heater blocks being supported against the inside parts of each of said annular belts so that each of said heater blocks may be moved towards or away in a direction perpendicular to the transferring direction of each of the box-like items, and heater moving mechanisms for moving each of said heater blocks toward or away from the inside parts of each of said annular belts in synchronism with a transferring speed of the box-like items, said heater moving mechanisms including a plurality of cams extending along outer surfaces of said plurality of heater blocks in a transferring direction and a counter-transferring direction of the box-like items and mounted for reciprocation, each cam including a surface inclined to said passage and extending along the transferring direction for contacting said heater block outer surfaces, means for biasing the outer surfaces of said heater blocks toward said inclined surface of each of said cams, and means for reciprocating said cams in synchronism with the transferring speed of the box-like items, wherein said inclined surfaces of each of said cams become spaced apart a greater distance from each other as said cams extend along the transferring direction of the box-like items.

2. A sealing device for a packaging device according to claim 1 wherein said cams cause said heater blocks, disposed at an upstream side in the transferring direction, to be abutted against the inside parts of said annular belts in sequence, in response to an increase in the transferring speed of the box-like items, and said heater blocks being disposed at a downstream side in said transferring direction to be moved away from the inside parts of the said annular belts in sequence, in response to a decrease in the transferring speed of the box-like items.

3. A sealing device of a packaging device according to claim 1 in which rollers are rotatably provided along the transferring direction of the box-like items at outer surfaces of each of said heater blocks, said rollers facing said inclined surfaces of said cams.

4. A sealing device of packaging device according to claim 1, in which each of said annular belts is supported in such a manner that it may be reciprocated in a direction perpendicular to a transferring direction of the box-like items, and said annular belts are moved in a direction away from the right and left side surfaces of the box-like items on the transferring passage when the transferring of the box-like items is stopped.

5. A sealing device for use in a packaging machine including a plurality of annular belts for conveying a plurality of items along a path extending in a transfer direction, at a transfer speed, said sealing device comprising:
   a plurality of heater devices positioned along said path adjacent the annular belts;
   means for actuating said heater devices to transmit heat from said heater devices to a folded portion of a packaging sheet positioned about a side surface of the plurality of items to thermally adhere the folded portions;
   means for supporting each of said heater devices adjacent inner portions of the annular belts;
   means for moving each of said heater devices, towards and away from the annular belts in a direction substantially transverse to the transfer direction in synchronism with the transfer speed of the plurality of items; and
   said moving means including a cam positioned along an outer surface of said plurality of heater blocks and extending along the transfer direction, means for reciprocating said cam, and means for biasing said heater devices and said cam towards each other, said cam including a surface inclined to said path and extending along the transfer direction for contacting said heater block outer surface, said means for reciprocating comprising means for reciprocating said cam along the transfer direction in synchronism with the transfer speed of the items, said inclined surface being inclined away from and being spaced a greater distance from the items as said cam extends along the transfer direction of the items.

6. The sealing device for use in a packaging machine according to claim 5, said cam causing said heater devices to move towards the annular belts sequentially, starting from a heater device positioned upstream along the path in response to an increase in the transfer speed of the items and for moving the heater devices away from the annular belts in sequence, starting from a heater device positioned downstream along the path, in response to a decrease in the transfer speed of the items.

7. The sealing device for use in a packaging machine according to claim 5, further comprising a roller extending from each of said heater devices, said rollers adapted to contact the inclined surface of said cam.

8. The sealing device for use in a packaging machine according to claim 5, further comprising means for supporting each of the annular belts for reciprocatory movement in a direction substantially transverse to the transfer direction and means for moving the annular belts away from the items when transfer of the items if stopped.

9. The sealing device for use in a packaging machine according to claim 5, said heater devices being arranged in a plurality of rows each extending along the transfer direction of the items.

10. The sealing device for use in a packaging machine according to claim 9, said moving means comprising a plurality of cams positioned along outer surfaces of said rows of heater blocks, means for reciprocating said cams and means for biasing said cams and said heater devices towards each other.

11. The sealing device for use in a packaging machine according to claim 10, each of said cams comprising inclined surfaces extending along the transfer direction, said means for reciprocating comprising means for reciprocating said cams along the transfer direction in synchronism with the transfer speed of the items.

* * * * *

UNITED STATES PATENT AND TRADEMARK OFFICE
CERTIFICATE OF CORRECTION

PATENT NO. : 5,353,572
DATED : October 11, 1994
INVENTOR(S) : Toshio SHIGETA

It is certified that error appears in the above-indentified patent and that said Letters Patent is hereby corrected as shown below:

At the cover sheet, Item [56], line 6 under U.S. Patent Documents, change "Ishigashi" to ---Ishibashi---.

Signed and Sealed this

Sixteenth Day of May, 1995

Attest:

BRUCE LEHMAN

*Attesting Officer*    *Commissioner of Patents and Trademarks*